(12) United States Patent
Imboden

(10) Patent No.: US 12,147,199 B2
(45) Date of Patent: Nov. 19, 2024

(54) SOLAR WATCH COMPRISING A SHUTTER DEVICE

(71) Applicant: The Swatch Group Research and Development Ltd, Marin (CH)

(72) Inventor: Matthias Imboden, St-Blaise (CH)

(73) Assignee: The Swatch Group Research and Development Ltd, Marin (CH)

(*) Notice: Subject to any disclaimer, the term of this patent is extended or adjusted under 35 U.S.C. 154(b) by 380 days.

(21) Appl. No.: 17/669,646

(22) Filed: Feb. 11, 2022

(65) Prior Publication Data
US 2022/0291638 A1 Sep. 15, 2022

(30) Foreign Application Priority Data

Mar. 12, 2021 (EP) .................... 21162389

(51) Int. Cl.
*G04C 10/02* (2006.01)
*G02B 26/02* (2006.01)
*G04B 47/06* (2006.01)

(52) U.S. Cl.
CPC ............ *G04C 10/02* (2013.01); *G02B 26/02* (2013.01); *G04B 47/06* (2013.01)

(58) Field of Classification Search
CPC ......... G04C 10/02; G02B 26/02; G04B 47/06
USPC ........................................................ 368/205
See application file for complete search history.

(56) References Cited

U.S. PATENT DOCUMENTS

| | | | |
|---|---|---|---|
| 6,181,648 B1 * | 1/2001 | Mafune | G04C 10/02 368/242 |
| 2002/0109808 A1 * | 8/2002 | Sekiguchi | G02F 1/13471 349/96 |
| 2009/0298554 A1 * | 12/2009 | Kim | H04M 1/21 455/574 |
| 2011/0316715 A1 * | 12/2011 | Kato | H04M 1/21 340/815.45 |
| 2017/0068217 A1 * | 3/2017 | Chen | G04C 10/02 |
| 2018/0039232 A1 * | 2/2018 | Abramov | G04C 17/0091 |

FOREIGN PATENT DOCUMENTS

| | | | | |
|---|---|---|---|---|
| DE | 195 01 322 A1 | | 7/1995 | |
| DE | 19855549 A1 | * | 6/2000 | ............ G04B 19/06 |
| DE | 102016117045 A1 | * | 3/2017 | ............... G02F 1/01 |
| EP | 0 420 796 A1 | | 4/1991 | |
| EP | 2 293 155 A1 | | 3/2011 | |
| JP | 5-150055 A | | 6/1993 | |

OTHER PUBLICATIONS

European Search Report for EP 21 16 2389, dated Aug. 26, 2021.

* cited by examiner

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A watch (10) including a case provided with a back, with a crystal (12), with a set of components forming a horological movement (13), and with a dial (14) disposed between the movement and the crystal (12), the dial (14) including a photovoltaic cell module (16) connected to an electric accumulator (17) intended to provide an electrical energy source to the watch (10), the dial (14) further including a shutter device (18) arranged between the photovoltaic cell module (16) and the crystal (12) of the watch (10), and configured to occupy a shutter state wherein it masks the entire photovoltaic cell module (16) and an exposure state wherein it exposes all or part of the photovoltaic cell module (16).

16 Claims, 3 Drawing Sheets

SOLAR WATCH COMPRISING A SHUTTER DEVICE

CROSS REFERENCE TO RELATED APPLICATIONS

This application claims priority to European Patent Application No. 21162389.7 filed Mar. 12, 2021, the entire contents of which are incorporated herein by reference.

TECHNICAL FIELD OF THE INVENTION

The invention relates to the field of horology, and in particular the field of solar watches including an electric accumulator supplied by a photovoltaic cell.

More particularly, the invention relates to a solar watch comprising a shutter device.

Technological Background

Solar watches include in a known manner an electric accumulator supplied by photovoltaic cells in order to power a quartz electronic horological movement or an auxiliary electronic function.

The photovoltaic cells are disposed under the crystal of the watch, generally on the dial so as to absorb a maximum of light and generate sufficient energy to supply the electric accumulator and thus confer to the electronic horological movement or to the auxiliary electronic function an autonomy suitable for a user.

Nevertheless, the photovoltaic cells have a particular aesthetic appearance that may not be compatible with the potential expectations of users.

Therefore, it has been sought by some watch manufacturers to mask the photovoltaic cells.

In particular, watches are known from the prior art wherein the photovoltaic cells are disposed under a dial made of a translucent material. For example, the dial may consist of a thin ceramic or mother-of-pearl leaf, or of at least one translucent ink deposited on a transparent substrate.

Dials also exist comprising a plurality of through-holes invisible to the naked eye, a particular surface state or a particular treatment, making it possible to expose the photovoltaic cells to the light while hiding them from the view of the user.

However, these solutions do not give complete satisfaction in that, during their implementation, the photovoltaic cells generally have a relatively low overall efficiency, and consequently, the charging time of the accumulator is particularly long.

Therefore, there is a need to provide a solar watch the photovoltaic cells of which may be hidden from the view of a user, so that the dial of said watch may have a desired visual appearance, while making it possible for the photovoltaic cells to retain a high efficiency if necessary.

SUMMARY OF THE INVENTION

The invention resolves the aforementioned drawbacks by proposing a solar watch making it possible to effectively recharge the electric accumulator while making it possible to retain as often as possible an aesthetic appearance corresponding to the desires of the user, for example a visual appearance of a traditional watch, that is to say including a dial having or not having decorations.

To this end, the present invention relates to a watch comprising a case provided with a middle to which are fixed a back and a crystal, with a set of components forming a horological movement, and with a dial disposed between the movement and the crystal, the dial including a photovoltaic cell module connected to an electric accumulator intended to provide an electrical energy source.

The dial further comprises a shutter device arranged between the photovoltaic cell module and the crystal of the watch, and configured to be able to occupy a shutter state wherein it masks the entire photovoltaic cell module and an exposure state wherein it exposes all or part of the photovoltaic cell module.

In particular embodiments, the invention may further include one or more of the following features, taken alone or according to any technically possible combinations.

In particular embodiments, the watch comprises a control mechanism including a movement transmission system configured to move shutter elements of the shutter device under the effects of an actuation member, so as to drive the shutter device in the shutter state or in the exposure state.

The shutter and exposure states of the shutter device are respectively defined by distinct positions taken by said device.

In particular embodiments, the actuation member consists of a motor controlled by instructions delivered by a control unit.

In particular embodiments, the control unit includes a brightness sensor configured to control the motor so as to drive the shutter device in the shutter state when the brightness is below a certain threshold and in the exposure state when the brightness is above said threshold.

In particular embodiments, the control unit includes a sensor capable of delivering information relating to the charge state of the accumulator, to the control unit, the latter being configured to control the motor so as to drive the shutter device in the exposure state when the information provided by said sensor is representative of a charge state of the accumulator below a predefined threshold.

In particular embodiments, the control unit is configured to control the motor so as to drive the shutter device in the exposure state, in response to the effect of movement and/or geolocation sensors, when said effect causes the emission of a signal representative of a physical or sportive activity of the user.

In particular embodiments, the control unit is configured to control the motor based on instructions resulting from the automatic learning processing of data collected and accumulated over time by movement, geolocation and/or brightness sensors.

In particular embodiments, the actuation member consists of a bezel, a crown or a push-button.

In particular embodiments, the actuation member consists of the horological movement, so that the shutter device is controlled to occupy the shutter state at a predefined time and is controlled to occupy the exposure state at a predefined time.

In particular embodiments, the shutter device is formed by an iris with leaves, said leaves being configured to fit into the middle when the shutter device occupies the exposure state and being configured to be deployed so as to cover the photovoltaic cell module when the shutter device occupies the shutter state.

In particular embodiments, the shutter device includes two disks including opaque circular sectors and transparent circular sectors, said disks being arranged coaxially opposite one another and rotatable relative to one another.

The disks are configured so that the opaque circular sectors and the transparent circular sectors of a disk are arranged respectively facing the opaque circular sectors and the transparent circular sectors of the other disk, in order that the shutter device occupies the exposure state, and so that the opaque circular sectors and the transparent circular sectors of a disk are arranged respectively facing the transparent circular sectors and the opaque circular sectors of the other disk, in order that the shutter device occupies the shutter state.

In particular embodiments, the shutter device is formed by a set of leaves in the shape of circular sectors, arranged rotatably about the axis of the hands in relation to one another so as to be adjacent to one another in order that the shutter device occupies the shutter state, and so as to be superposed on one another in order that the shutter device occupies the exposure state.

In particular embodiments, the shutter device is formed by a set of shutters extending lengthwise parallel with one another, said shutters being configured to be rotated about their longitudinal axis so that the lateral flanks of a shutter are adjoining the lateral flanks of the adjacent shutters in order that the shutter device occupies the shutter state.

In particular embodiments, the photovoltaic cell module is covered with a layer of lubricant, said layer being interposed between said module and the shutter device.

In particular embodiments, the shutter device includes a disk having negative photochromic properties, that is to say that the disk is adapted to have an opaque appearance when the ambient brightness is below a certain threshold and to have a transparent appearance when the ambient brightness is above said threshold.

In particular embodiments, the shutter device includes a disk having electrochromic properties, the watch including a management module connected to a brightness sensor and configured to subject the disk to an electric voltage of predetermined intensity in order that said disk takes an opaque appearance when the ambient brightness is below a predefined threshold.

In particular embodiments, the management module is configured so as to subject the disk to an electric voltage of predetermined intensity in order that said disk takes an opaque appearance, when the electric accumulator is fully charged.

In particular embodiments, the watch comprises an actuation member configured to control, on request of the user, the management module so as to, alternately, apply or not apply a voltage to the disk in order that it takes an opaque or transparent appearance.

BRIEF DESCRIPTION OF THE FIGURES

Other features and advantages of the invention will become apparent upon reading the following detailed description given only by way of non-limiting example, with reference to the appended drawings wherein.

DETAILED DESCRIPTION OF THE INVENTION

Figure 1:
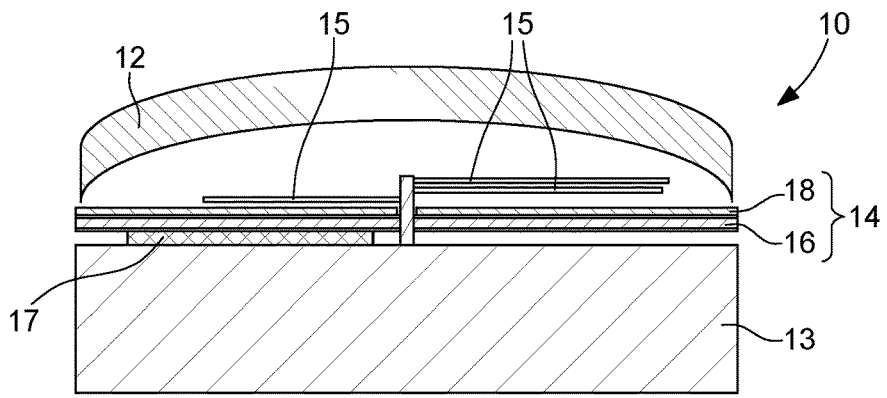
FIG. 1 schematically shows a sectional view of a case of a watch comprising a shutter device according to one embodiment of the invention, wherein a shutter device occupies a shutter state wherein it masks an entire photovoltaic cell module.

The present invention relates to a watch 10 schematically shown in the sectional view of FIG. 1 comprising a case provided with a middle 11 to which are fixed a back and a crystal 12, with a set of components forming a horological movement 13, and with a dial 14 disposed between the horological movement 13 and the crystal 12.

The horological movement 13 drives in a manner known by the person skilled in the art a hand-fitting 15 comprising an hours-hand, a minutes-hand and optionally a seconds-hand. To this end, the dial 14 includes a through-hole receiving the axis of the hands.

In the example of embodiment of the invention described in the present text, the horological movement 13 is a quartz movement.

In order to provide an electrical energy source to supply the horological movement 13, the dial 14 includes a photovoltaic cell module 16 connected to an electric accumulator 17. The photovoltaic cells 16 preferably extend over the entire visible surface of the dial 14, as shown in the sectional view of FIG. 1.

The photovoltaic cell module 16 may comprise one or more elementary cells of the heterojunction or multijunction type, connected in parallel or in series. The photovoltaic cells 16 may be made, in a manner known by the person skilled in the art, from semi-conductor materials based on copper, indium, gallium and selenium, based on cadmium telluride, based on monocrystalline gallium arsenide or based on monocrystalline or polycrystalline silicon, or on perovskites. It should be noted that these examples are not limiting and that the person skilled in the art will know how to find the type of photovoltaic cells adapted to the invention.

Alternatively, if the horological movement 13 is a mechanical movement, the electrical energy source may be intended to supply a mechanism of an auxiliary electronic function, for example a compass, an altimeter, a temperature sensor, a lighting device, etc., said auxiliary electronic function not being shown in the figures.

The dial 14 further comprises a shutter device 18 arranged between the photovoltaic cell module 16 and the crystal 12 of the watch 10.

Preferably, for reasons of compactness of the watch 10, the shutter device 18 may be arranged against the photovoltaic cell module 16. In this case, said module is then advantageously covered with a layer of lubricant, said layer then being interposed between said module and the shutter device 18. The lubricant is advantageously selected for its limited impact on the electro-optical performances of the photovoltaic cells chosen.

The shutter device 18 is configured to be able to occupy a shutter state wherein it masks the entire photovoltaic cell module 16, as schematically shown in FIG. 1, and an exposure state wherein it exposes all or part of the photovoltaic cell module 16.

It should be noted here that in some cases, for example when the photovoltaic cell module consists of a plurality of cells, all of said cells must be exposed to a substantially similar light intensity to guarantee the correct operation of said module.

In one embodiment of the invention schematically shown in FIG. 1, the shutter device 18 includes a disk comprising negative photochromic properties, that is to say that the disk is adapted to have an opaque appearance when the ambient brightness is below a certain threshold and to have a transparent appearance when the ambient brightness is above said threshold.

In the present text, "ambient brightness" means the optical radiation impacting the dial 14 of the watch 10.

For example, such a disk may be made with the aid of a complex of iron and of magnesium.

This embodiment of the invention is advantageously simple and not very expensive to develop and to produce.

Furthermore, thanks to the disk, the photovoltaic cell module 16 may extend over a surface equal to that of the dial 14, the whole of this surface being able to be masked or exposed by said disk.

The surface of the photovoltaic cell module 16 being able to be totally exposed when the conditions are adequate, the effectiveness of the charging of the electric accumulator 17 is thereby advantageously considerably improved.

Alternatively, the disk may have electrochromic properties, that is to say that the opaque or transparent appearance of the material constituting it may vary by applying thereto an electric voltage or not.

To this end, the watch 10 may include a management module connected to a brightness sensor and configured to subject the disk to an electric voltage of predetermined intensity in order that said disk takes an opaque appearance when the ambient brightness is below a predefined threshold.

Moreover, the rest of the time, the management module does not apply electric voltage to the disk so that it retains its transparent appearance and that the electric accumulator 17 can be recharged.

Furthermore, the management module may be configured so as to subject the disk to an electric voltage of predetermined intensity in order that said disk takes an opaque appearance when the electric accumulator 17 is fully charged.

Thus, when it has an opaque appearance, the disk makes it possible to protect the electric accumulator 17 from a possible overload.

Moreover, the watch 10 may comprise an actuation member 19 configured to control the management module, on request of the user, so as to, alternately, apply or not apply an electric voltage to the disk in order that it takes an opaque or transparent appearance. In other terms, the actuation member 19 is configured to drive the shutter device 18 alternately in the shutter state and in the exposure state according to the choice of the user. Examples of actuation member are cited in the remainder of the text.

In another embodiment shown in FIGS. 2 to 8, the watch 10 includes a control mechanism including a movement transmission system 20 configured to move shutter elements 180 of the shutter device 18 under the effects of an actuation member 19, so as to drive the shutter device 18 alternately in the shutter state or in the exposure state.

Advantageously, when the shutter device 18 occupies the shutter state, the shutter elements 180 extend facing the entire surface of the photovoltaic cell module 16 and have a visible outer face, known as "external parts face", and an inner face intended to be facing the photovoltaic cell module 16.

When the shutter device 18 occupies the shutter state, the external parts face can be seen by the user and makes it possible for the watch 10 to retain a desired aesthetic appearance, according to the visual appearance of the external parts face.

In examples of this embodiment described hereafter, the shutter elements 180 may be made of metal material or of polymer material, such as plastic, or of any other suitable material.

To this end, said external parts face may include a coating, for example produced by any type of thin layer deposition method known as such by the person skilled in the art.

Moreover, preferably, when the shutter device 18 occupies the exposure state, the shutter elements 180 are not or are not very visible for a user, which makes it possible to maximise the surface of the photovoltaic cell module 16 exposed to the ambient brightness.

Examples of shutter elements 180 are described in detail hereafter and are shown in FIGS. 2 to 5c.

Figure 2:
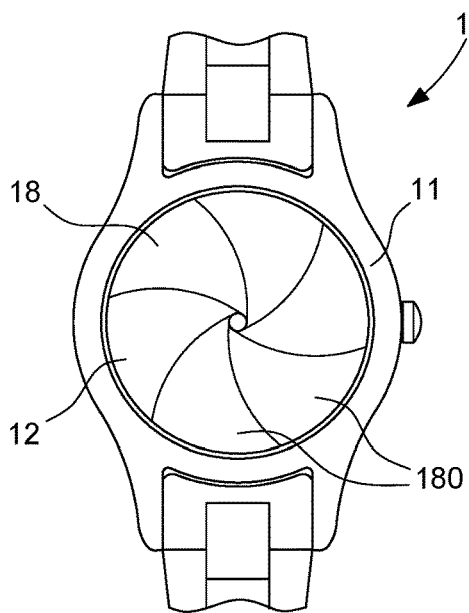
FIG. 2 shows a front view of the watch of FIG. 1 comprising an example of shutter device according to another embodiment of the invention, said shutter device consisting of an iris with leaves and being in the shutter state.

FIG. 2 shows a watch 10 in front view comprising an example of shutter device 18 formed by an iris with leaves, which is in the shutter state. The shutter elements 180 are then formed by the leaves that are configured to fit into the middle 11, or for example under a bezel, in order to be hidden from the view of a user when the shutter device 18 occupies the exposure state, and to be deployed so as to cover the photovoltaic cell module 16 when the shutter device 18 occupies the shutter state.

More particularly, the leaves superpose on one another and each extend between an end known as "proximal end" and an end known as "distal end", said proximal end being freely rotatably fixed in a fixed ring in relation to the middle 11 or directly in said middle 11.

The proximal end includes a pin or a teat extending so as to cooperate with a hole formed in a ring rotatably about a substantially coaxial axis with that of the hands. The holes extend helically in the ring, so that the rotation of said ring causes the pivoting of the leaves, and thus, the formation of a more or less large central opening around the axis of the hands.

The determination of the most suitable shape of the leaves is, as such, within the reach of the person skilled in the art.

In other alternative embodiments of the iris with leaves, the leaves are rotated during the rotation of the moveable ring by any suitable mechanism, the design of which is, as such, within the reach of the person skilled in the art.

One of the advantages of the embodiment of the shutter device 18 in the form of an iris with leaves resides in the fact that the shutter elements 180, here the leaves, are fully clear of the photovoltaic cell module 16 when said shutter device 18 occupies the exposure state.

Figure 3A:
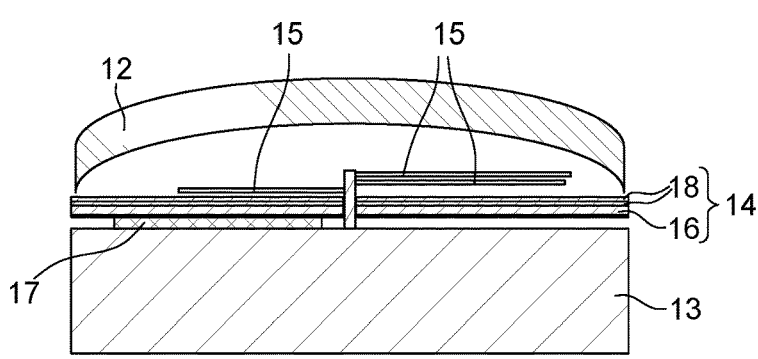
FIG. 3a shows a sectional view of a case of a watch according to FIG. 2 comprising another example of shutter device.
Figures 3B, 3C:
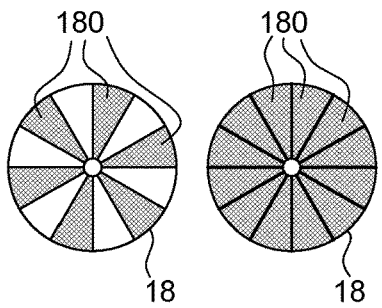
FIGS. 3b and 3c show an isolated front view of the shutter device of FIG. 3a respectively occupying an exposure state and the shutter state.

In another example of embodiment of the shutter device 18 shown in FIGS. 3a to 3c, the shutter device 18 is formed by two disks disposed coaxially opposite, said disks being provided with a through-hole which extends the axis of the hands.

The disks are for example made of polycarbonate.

As seen in FIGS. 3b and 3c, each of the disks includes, on its face opposite the other disk, a plurality of opaque circular sectors evenly distributed, at a distance from one another, around the centre of each disk. In this way, each disk includes an alternation of transparent and opaque circular sectors; that is to say that each transparent sector is interposed between two opaque sectors, and that each opaque sector is interposed between two transparent sectors, as shown in particular in the front view of FIG. 3b.

The opaque circular sectors form the shutter elements 180 and may be made by thin layer deposition or printing methods. Advantageously, the opaque circular sectors of the disks are arranged on the faces of said disks with which they are opposite.

The opaque circular sectors of a disk have dimensions complementary of the circular sectors of the other disk, in that when the shutter device 18 is in shutter state, the opaque sectors of a disk are facing the entire surface of the transparent sectors of the other disk, as shown in the front view of FIG. 3c.

In order that the shutter device 18 reaches the shutter state, one of the disks is configured to be rotated by the control mechanism about the axis of the hands relative to the other disk, the latter being fixed in relation to the middle 11.

Figure 4A:
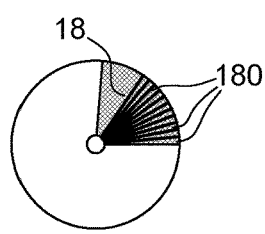
FIGS. 4a and 4b show an isolated front view of another example of the shutter device occupying respectively an intermediate state and an exposure state.
Figure 4B:
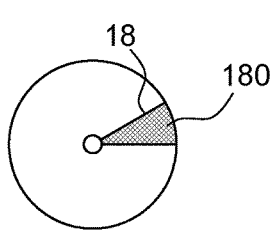

When the shutter device 18 occupies the exposure state, the opaque circular sectors of each disk are superposed on one another, so as to expose the photovoltaic cell module 16 to the ambient brightness, as shown in FIGS. 3b and 4b.

In the exposure state, the shutter device 18 exposes substantially 50% of the surface of the dial 14.

By way of non-limiting example, the disks each include six opaque sectors and six transparent sectors.

In another example of embodiment of the shutter device 18 not shown in the figures, the shutter device 18 may be similar to that described above except that the disks are formed by sets of leaves extending radially between the middle 11 and the axis of the hands, said leaves being separated from one another by through-holes. The leaves may be connected to one another, at each of their ends, by a peripheral ring extending around said leaves and by a central ring arranged around the axis of the hands.

The leaves and the through-holes each have the shape of a disk sector, said leaves being dimensioned so as to cover the entire surface of the dial 14 when the shutter device 18 is in shutter state.

The disks are rotatable in relation to one another. More particularly, one of the disks includes leaves, known as "moveable leaves", and is configured to be rotated about the axis of the hands relative to the other disk, said other disk including leaves, known as "fixed leaves", arranged in a fixed manner in relation to the middle 11.

As described in the previous example of embodiment of the shutter device 18, the disks preferably have an identical number of leaves, for example six.

The leaves are disposed so that a fixed leaf is adjacent to a moveable leaf, that is to say so that each fixed leaf is interposed between two moveable leaves and that each moveable leaf is interposed between two fixed leaves, when the shutter device 18 is in shutter state.

Thus, when the shutter device 18 occupies the exposure state, each moveable leaf is superposed on a fixed leaf or vice versa.

In yet another embodiment of the shutter device 18, here schematically shown in FIGS. 4a and 4b, the shutter elements 180 may be formed by a set of leaves of the circular sector shape, arranged adjacently to one another and so as to be adapted to superpose on one another.

More particularly, the leaves are all rotatable about the axis of the hands, except for one fixed leaf, the moveable leaves being configured so as to be successively rotated in order to progressively expose the photovoltaic cell module 16, when the shutter device 18 changes from the shutter state to the exposure state. Such a layout is schematically illustrated by FIG. 4a.

Thus, the moveable leaves are superposed on the fixed leaf, or vice versa, when the shutter device 18 occupies the exposure state, as shown in FIG. 4b.

It should be noted that when the shutter device 18 according to this example of embodiment occupies the shutter state, it is in accordance with the schematic representation of FIG. 3c.

This feature in particular allows the shutter device 18 to have intermediate states between the exposure and shutter states. Furthermore, this feature makes it possible to be able to choose the surface occupied on the dial 14 by the shutter device 18 and by the photovoltaic cell module 16. By way of example, the shutter device 18 may include leaves intended to only clear a predefined circular sector of the dial 14 when it occupies the exposure state, for example the half or the quarter of the dial 14.

Furthermore, it may be envisaged that the moveable leaves are progressively rotated according to predefined time intervals. For example, the control mechanism may be configured so as to rotate a leaf every hour, so that the shutter device 18 occupies the exposure state when the sun is at the zenith, or during the day, and its shutter state in the night.

Figure 5A:
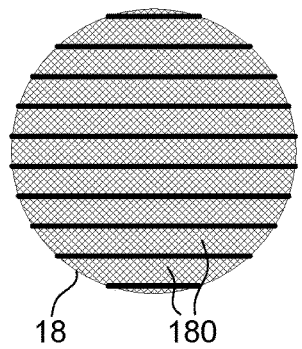
FIGS. 5a to 5c show an isolated front view of another example of the shutter device occupying respectively a shutter state, an intermediate state and an exposure state.
Figure 5B:
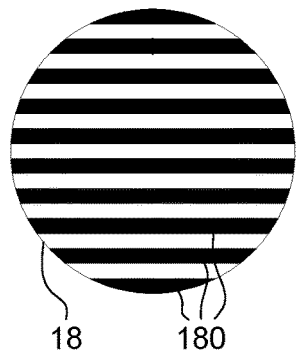
Figure 5C:
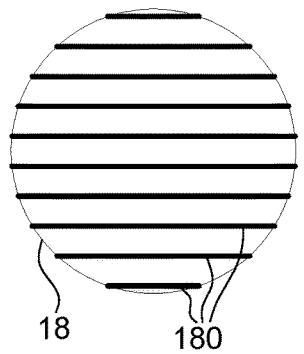

In yet another example of embodiment of the shutter device 18 shown in FIGS. 5a to 5c, the shutter elements 180 are formed by a set of shutters extending lengthwise parallel with one another. Between their longitudinal ends, each shutter extends between two lateral flanks.

The shutters delimit, in the present example of embodiment, circular segments in the middle 11 of the watch 10.

The shutters are fixed to the middle 11 by their longitudinal ends and are configured to be rotated about their longitudinal axes.

They are further dimensioned so that the lateral flanks of one shutter are adjoining the lateral flanks of the adjacent shutters in order that the shutter device 18 occupies the shutter state, as illustrated in FIG. 5a.

It should be noted that other examples of this embodiment of the shutter device 18 may moreover be possible, even though not described in the present text, provided that it includes shutter elements 180 moveable between a position wherein they cover the entire surface of the photovoltaic cell module 16 so as to mask said module from the view of the user, and a position wherein they expose said module to the view of the user, and consequently, to the ambient brightness.

In one embodiment of the invention, the actuation member 19 consists of a moveable component of the watch 10, for example a bezel, a crown or a push-button.

More particularly, the rotation of the bezel or of the crown, or the pressing of a push-button may, by means of the movement transmission system 20, make it possible to change the state of the shutter device 18.

Thus, the user may advantageously, when they so desire, manually modify the state of the shutter device 18 and choose if they desire that the external parts face or that the photovoltaic cell module 16 is visible.

Figure 6:
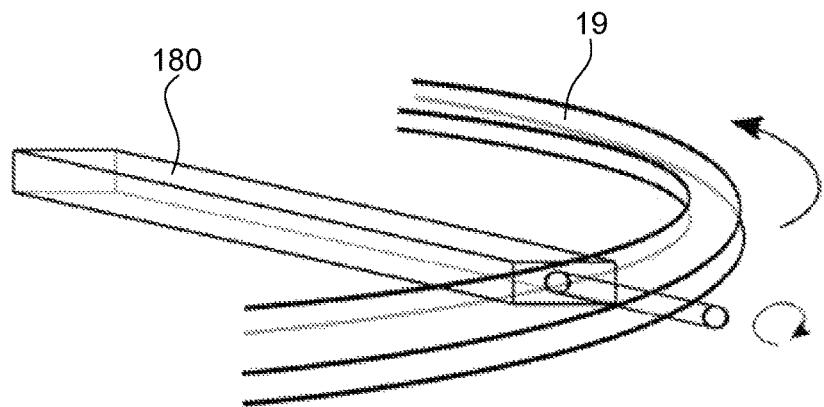
FIG. 6 schematically shows in perspective an example of a control mechanism of which the watch of FIG. 2 is provided, said example being applied to the example of embodiment of the shutter device shown in FIGS. 5a to 5c, FIG. 7 schematically shows in perspective an example of a transmission system of which the watch of FIG. 2 is provided, said example being applied to the example of embodiment of the shutter device shown in FIGS. 5a to 5c.
Figure 7:
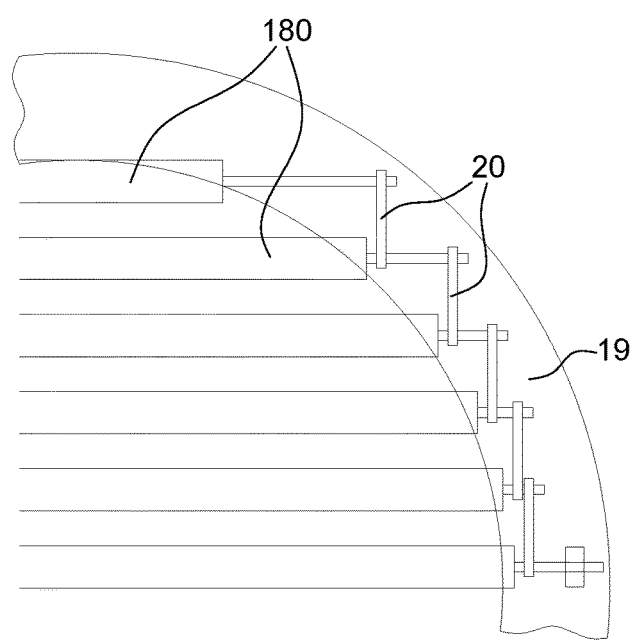

In particular, as schematically shown in FIGS. 6 and 7 in an example of control mechanism and of transmission system 20 applied to the example of embodiment of the shutter device 18 shown in FIGS. 5a to 5c, the watch 10 may include a grooved bezel cooperating with a toothed wheel integral with a shutter, known as "motor shutter", the longitudinal axis of which is preferably intersecting with the axis of the hands.

FIG. 7 illustrates in particular a transmission system 20 arranged so as to rotate the shutters. The transmission system 20 comprises connection members, here consisting of flexible links, for examples belts, arranged between each shutter and configured to subject their rotation to the rotation of the motor shutter.

In other words, the shutters are securely connected to one another by the connection members, so that a movement of the motor shutter caused by the effect of the bezel rotates all of the other shutters.

The connection members may consist of any element known per se by the person skilled in the art, for example by gears.

These examples of control mechanism and of transmission system 20 may also be applied to the examples of embodiments of the shutter device 18 shown in FIGS. 2 to 4c, with adjustments within the reach of the person skilled in the art.

In another embodiment of the invention (not shown in the figures), the actuation member 19 consists of the horological movement 13, so that the shutter device 18 is controlled to occupy the shutter state at a predefined time and is controlled to occupy the exposure state at a predefined time.

By way of example, the shutter device 18 may be controlled to occupy the shutter state at a time representative of a significant reduction of the ambient brightness, for example the time of the sunset, and to be controlled to occupy the exposure state at a time representative of a significant increase of the ambient brightness, for example the time of the sunrise.

Figure 8:
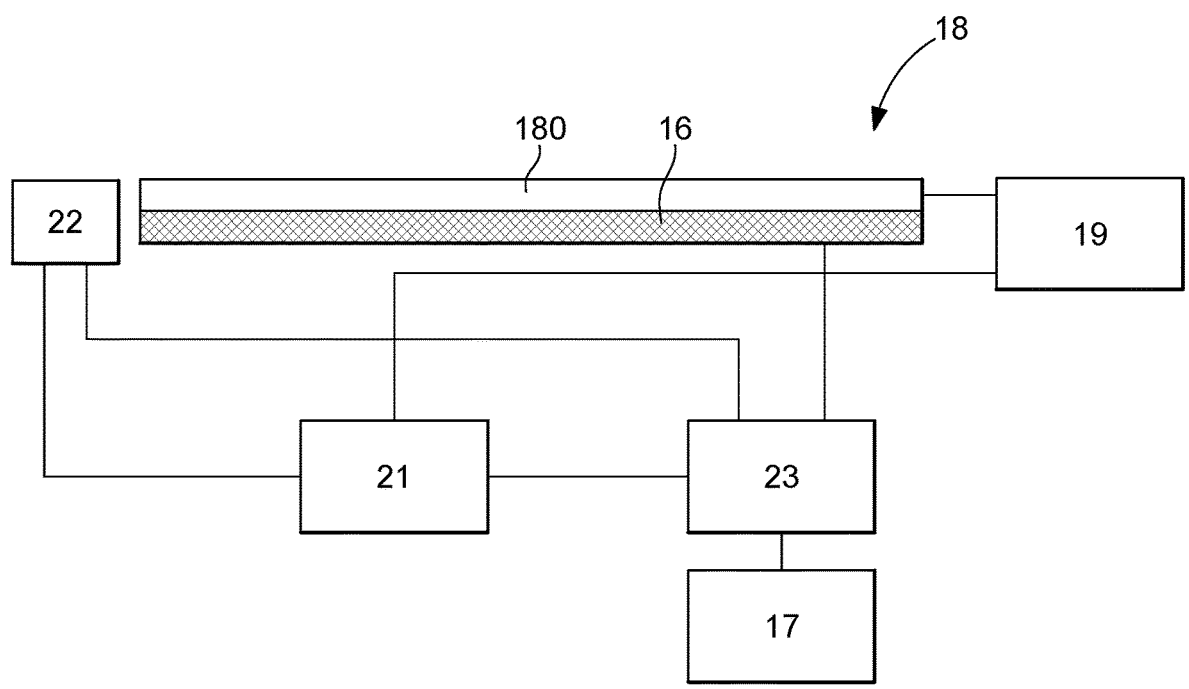
FIG. 8 shows a block diagram of the case of a watch of FIG. 1 according to another embodiment of the invention.

In yet another embodiment of the invention shown by the block diagram in FIG. 8, the actuation member 19 to which the movement transmission system 20 is connected may consist of a motor controlled by instructions delivered by the control unit 21. The motor is advantageously supplied with electricity by the electric accumulator 17.

Such a motor may be a stepping motor of the Lavet type and may be arranged in a manner known by the person skilled in the art within the watch 10, between the dial 14 and the back.

The control unit 21 described here may comprise computing means, such as a microprocessor.

For example, the control unit 21 may be connected to a brightness sensor 22, as shown in FIG. 8, and be configured to control the motor so as to drive the shutter device 18 in the shutter state when the ambient brightness is below a certain threshold and in the exposure state when the ambient brightness is above said threshold.

Advantageously, the watch 10 includes an electrical power management module 23, known as such by the person skilled in the art, connected to the control unit 21, to the motor, to the electric accumulator 17, to the photovoltaic cells 16 and optionally to the brightness sensor 22.

In one example of embodiment not shown in the figures, the brightness sensor 22 may advantageously be formed by the photovoltaic cell module 16.

The motor may also be controlled by the control unit 21 according to predefined times to drive the shutter device 18 in the shutter state at a predefined time, for example a time representative of the sunset, and in the exposure state at a predefined time, for example a time representative of the sunrise.

To this end, the control unit 21 may implement position sensors linked to the horological movement 13 or to the hands of the hours and/or of the minutes.

In yet another example of embodiment, the control unit 21 may control the motor in response to the effect of the movement and/or geolocation sensors.

In particular, the control unit 21 may be configured to control the motor so as to drive the shutter device 18 in the exposure state when the signal emitted by the movement and/or geolocation sensors is representative of a physical or sportive activity of the user. Additionally, the control unit 21 may be configured to control the motor so as to drive the shutter device 18 in the shutter state if the signal emitted by the movement and/or geolocation sensors is representative of a physical or sportive activity of the user.

Finally, the control unit 21 may be connected to a sensor capable of delivering information relating to the charge state of the electric accumulator 17, to said control unit 21, it being configured to control the motor so as to drive the shutter device 18 in the exposure state when the information provided by said sensor is representative of a charge state of the electric accumulator 17 below a predefined threshold.

Alternatively or additionally to these features, the control unit 21 may be configured to communicate with an electronic apparatus such as a computer, an electronic tablet or a smartphone, so as to receive instructions for controlling the motor to change the state of the shutter device 18 via the control mechanism 21.

Advantageously, the controlling of the motor may be performed by implementing one of the aforementioned features or a combination of the latter, that is to say that it may be performed following instructions transmitted by the control unit 21 based on information provided by one or more of the sensors described in the aforementioned examples and/or provided by an electronic apparatus.

In other words, the control unit 21 may control the motor according to a single criterion or a plurality of criteria combined together.

Advantageously, the control unit 21 may control the motor based on instructions resulting from the processing of data collected and accumulated over time by the movement, geolocation and/or brightness sensors 22, said data being representative of the lifestyle of the user of the watch 10. This processing is advantageously performed by any automatic learning data analysis method, for example the methods of the deep learning type, the analysis being able in this case to make use of neural networks.

It should be specified that the invention also relates to any technically possible combination of examples and embodiments described above.

Indeed, it is for example possible to produce a watch 10 according to the present invention, comprising a disk with negative photochromic properties combined with one of the shutter elements 180 described above, connected to a control mechanism 21.

Moreover, in the present text a watch 10 has been considered the case of which is round in shape. However, the case of the watch 10 may be of a different shape, for example oval or square, the shape of the shutter elements 180 then being adapted to the shape of said case.

The invention claimed is:

1. A watch comprising:
a case provided with a middle to which are fixed a back and a crystal, with a set of components forming a horological movement, and with a dial disposed between said movement and the crystal, the dial including a photovoltaic cell module connected to an electric accumulator intended to provide an electrical energy source,
said dial further comprising a shutter device arranged between the photovoltaic cell module and the crystal of the watch, and an actuation member for driving the shutter device such that the shutter device occupies a shutter state in which the entire photovoltaic cell module is masked and an exposure state in which all or part of the photovoltaic cell module is exposed,
wherein the actuation member includes a motor controlled by instructions delivered by a control unit, and
wherein the control unit includes a brightness sensor configured to control the motor such as to drive the shutter device in the shutter state when the brightness is below a certain threshold and in the exposure state when the brightness is above said threshold.

2. The watch according to claim 1, wherein the control unit includes a movement transmission system configured to move shutter elements of the shutter device under the effects of the actuation member, so as to drive the shutter device in the shutter state or in the exposure state.

3. The watch according to claim 1, wherein the control unit includes a sensor capable of delivering information relating to the charge state of the electric accumulator, to the control unit, the control unit being configured to control the motor so as to drive the shutter device in the exposure state when the information provided by said sensor is representative of a charge state of the electric accumulator below a predefined threshold.

4. The watch according to claim 1, wherein the control unit is configured to control the motor so as to drive the shutter device in the exposure state, in response to the effect of movement and/or geolocation sensors, when said effect causes the emission of a signal representative of a physical or sportive activity of the user.

5. The watch according to claim 1, wherein the control unit is configured to control the motor based on instructions resulting from an automatic learning processing of data collected and accumulated over time by movement, geolocation and/or brightness sensors.

6. The watch according to claim 2, wherein the actuation member includes a bezel, a crown or a push-button.

7. The watch according to claim 2, wherein the actuation member includes the horological movement, so that the shutter device is controlled to occupy the shutter state at a predefined time and is controlled to occupy the exposure state at a predefined time.

8. The watch according to claim 1, wherein the shutter device is formed by an iris with leaves, said leaves being configured to fit into the middle when the shutter device occupies the exposure state and being configured to be deployed so as to cover the photovoltaic cell module when the shutter device occupies the shutter state.

9. The watch according to claim 1, wherein the shutter device includes two disks including opaque circular sectors and transparent circular sectors, said disks being arranged coaxially opposite one another and rotatable relative to one another, said disks being configured so that the opaque circular sectors and the transparent circular sectors of a disk are arranged respectively facing the opaque circular sectors and the transparent circular sectors of the other disk, in order that the shutter device occupies the exposure state, and so that the opaque circular sectors and the transparent circular sectors of a disk are arranged respectively facing the transparent circular sectors and the opaque circular sectors of the other disk, in order that the shutter device occupies the shutter state.

10. The watch according to claim 1, wherein the shutter device is formed by a set of leaves in the shape of circular sectors, arranged rotatably about the axis of the hands in relation to one another so as to be adjacent to one another in order that the shutter device occupies the shutter state, and so as to be superposed on one another in order that the shutter device occupies the exposure state.

11. The watch according to claim 1, wherein the shutter device is formed by a set of shutters extending lengthwise parallel with one another, said shutters being configured to be rotated about their longitudinal axis so that the lateral flanks of a shutter are adjoining the lateral flanks of the adjacent shutters in order that the shutter device occupies the shutter state.

12. The watch according to claim 1, wherein the photovoltaic cell module is covered with a layer of lubricant, said layer being interposed between said module and the shutter device.

13. The watch according to claim 1, wherein the shutter device includes a disk adapted to have an opaque appearance when the ambient brightness is below a certain threshold and to have a transparent appearance when the ambient brightness is above said threshold.

14. The watch according to claim 1, wherein the shutter device includes a disk having electrochromic properties, said watch including a management module connected to the brightness sensor and configured to subject the disk to an electric voltage of predetermined intensity in order that said disk takes an opaque appearance when the ambient brightness is below a predefined threshold.

15. The watch according to claim 14, wherein the management module is configured so as to subject the disk to an electric voltage of predetermined intensity in order that said disk takes an opaque appearance when the electric accumulator (17) is fully charged.

16. The watch according to claim 14, wherein the actuation member is configured to control, on request of the user, the management module so as to, alternately, apply or not apply a voltage to the disk in order that it takes an opaque or transparent appearance.

\* \* \* \* \*